US 12,185,441 B2

(12) United States Patent
Dableh (10) Patent No.: US 12,185,441 B2
(45) Date of Patent: Dec. 31, 2024

(54) AUTONOMOUS LIGHT POWER DENSITY DETECTORS

(71) Applicant: JDRF Electromag Engineering Inc., Mississauga (CA)

(72) Inventor: Roumanos Dableh, Oakville (CA)

(73) Assignee: JDRF Electromag Engineering Inc., Mississauga (CA)

( * ) Notice: Subject to any disclaimer, the term of this patent is extended or adjusted under 35 U.S.C. 154(b) by 162 days.

(21) Appl. No.: 18/247,362

(22) PCT Filed: Sep. 23, 2021

(86) PCT No.: PCT/IB2021/058698
§ 371 (c)(1),
(2) Date: Mar. 30, 2023

(87) PCT Pub. No.: WO2022/070007
PCT Pub. Date: Apr. 7, 2022

(65) Prior Publication Data
US 2023/0413406 A1    Dec. 21, 2023

Related U.S. Application Data (60) Provisional application No. 63/085,455, filed on Sep. 30, 2020.

(51) Int. Cl.
*H05B 47/11* (2020.01)
*H05B 47/19* (2020.01)

(52) U.S. Cl.
CPC .............. *H05B 47/11* (2020.01); *H05B 47/19* (2020.01)

(58) Field of Classification Search
CPC ...... H05B 47/11; H05B 47/19; H05B 47/175; Y02B 20/40
See application file for complete search history.

(56) References Cited

U.S. PATENT DOCUMENTS 7,633,406 B2    12/2009    Miki
8,100,552 B2    1/2012    Spero
(Continued)

FOREIGN PATENT DOCUMENTS

CN    110353449 A  *  10/2019    ............. A45D 42/00
EP    3298432 B1  *  7/2019    ............. G01S 17/04
(Continued)

OTHER PUBLICATIONS

PCT International Application No. PCT/IB2021/058698, International Search Report, dated Dec. 29, 2021, 2 pages.

*Primary Examiner* — Abdullah A Riyami
*Assistant Examiner* — Syed M Kaiser
(74) *Attorney, Agent, or Firm* — DLA PIPER LLP (US)

(57) ABSTRACT

An example of an apparatus is provided. The apparatus includes a power sensor to measure a power used to emit light. In addition, the apparatus includes a light source controller to control a light source to change an intensity of the light emitted by the light source. Furthermore, the apparatus includes a boundary detector to detect a room boundary. The apparatus also includes a device sensor to determine a position of a proximate device. The apparatus further includes a communications interface to communicate with the proximate device to transmit measured data to the proximate device and to receive device data from the proximate device. Also, the apparatus includes a processor to calculate a lighting power density based on the proximate device data and the measured data. The lighting power density is to be used by the light source controller to adjust the power used to emit the light.

20 Claims, 4 Drawing Sheets

(56) References Cited

U.S. PATENT DOCUMENTS

| | | |
|---|---|---|
| 8,159,156 B2 | 4/2012 | Henig et al. |
| 8,710,772 B2 | 4/2014 | Henig et al. |
| 8,729,835 B2 | 5/2014 | Henig et al. |
| 9,955,551 B2 | 4/2018 | Spero |
| 10,021,771 B1 | 7/2018 | Dableh |
| 10,264,652 B2 | 4/2019 | Chemel |
| 10,448,482 B2 | 10/2019 | Dableh |
| 10,798,800 B2 | 10/2020 | Dableh |
| 10,894,503 B2 | 1/2021 | Spero |
| 11,055,867 B2 | 7/2021 | Dableh |
| 2004/0105264 A1 | 6/2004 | Spero |
| 2007/0103007 A1 | 5/2007 | Miki |
| 2009/0180962 A1* | 7/2009 | Black ............. A61B 5/0071 424/9.2 |
| 2011/0031897 A1 | 2/2011 | Henig et al. |
| 2012/0161643 A1 | 6/2012 | Henig et al. |
| 2012/0194083 A1 | 8/2012 | Henig et al. |
| 2012/0206050 A1 | 8/2012 | Spero |
| 2015/0035440 A1 | 2/2015 | Spero |
| 2016/0360594 A1 | 12/2016 | Chemel |
| 2017/0091153 A1* | 3/2017 | Thimbleby ......... G06F 3/04845 |
| 2018/0255622 A1 | 9/2018 | Spero |
| 2018/0322649 A1 | 11/2018 | Dableh |
| 2019/0082518 A1 | 3/2019 | Dableh |
| 2020/0120780 A1 | 4/2020 | Dableh |
| 2020/0208960 A1 | 7/2020 | Dableh |
| 2021/0162912 A1 | 6/2021 | Spero |
| 2021/0287390 A1 | 9/2021 | Dableh |

FOREIGN PATENT DOCUMENTS

| | | | | |
|---|---|---|---|---|
| JP | 2015501578 A | * | 1/2015 | ........... G06V 40/103 |
| JP | 2019197521 A | * | 11/2019 | ........... A61B 5/1118 |
| WO | 2013/111134 | | 8/2013 | |
| WO | 2015/054611 | | 4/2015 | |

* cited by examiner

AUTONOMOUS LIGHT POWER DENSITY DETECTORS

CROSS-REFERENCE TO RELATED APPLICATION

This application is a National Stage of PCT/IB2021/058698, filed Sep. 23, 2021, which claims priority to U.S. Provisional Application Ser. No. 63/085,455, filed Sep. 30, 2020, which are incorporated by reference in their entireties.

BACKGROUND

In some jurisdictions, various rules may set upper limits on the lighting power density for various types of spaces found in commercial and residential buildings. The lighting power density of a space is the amount of electrical power used to illuminate a unit area, and may typically be expressed in units of Watts/ft$^2$. In some cases, the limits on the lighting power density may change over time as the rules are updated in response to higher electrical energy to light output conversion efficiencies due to advancements technology, such as in solid state illumination technologies, and an industry effort towards energy conservation. In general, lighting power density limits have declined over time and are forecasted to continue declining in the foreseeable future. In addition, the lighting power density may also be used by property managers to monitor power usage to collect data that may be used to track power consumption.

A manual process may be used for the onsite verification of the lighting power density for a given space. Onsite lighting power density verification involves measuring the actual power consumption and area values to calculate the lighting power density calculation of a space. The power consumption value is the sum total of the power consumed by all light fixtures within the given space and may be determined by taking electrical measurements on the appropriate branch-circuit or by adding up the known power consumption of each fixture within the space. The area value may be determined by taking direct physical dimension measurements of the space.

BRIEF DESCRIPTION OF THE DRAWINGS

Reference will now be made, by way of example only, to the accompanying drawings in which.

DETAILED DESCRIPTION

Devices to be used in a decentralized network of devices to calculate the lighting power density of the space within which they are located are provided. In the present examples, the decentralized network may self-organize and cooperate autonomously without human involvement. The determination of the lighting power density of a space is dependent on information from multiple devices within the space. Accordingly, no single device contains or obtains all of the information to perform the lighting power density calculation of the space without the contribution from at least one other device. The devices work together autonomously to measure the area of the space and determine total power consumed by light fixtures within the space, as part of the lighting power density calculation. The space for which the lighting power density is to be calculated is not particularly limited. For example, the space may be defined by a boundary that may include a combination of an opaque walls, walls with a window, a transparent or translucent wall, or a doorway.

To collect data from other devices, each device may be capable of selecting other devices located the space for which a lighting power density measurement is to be calculated. The devices selected may be a set of devices on a decentralized network. It is to be understood that the decentralized network may include devices that are not located in the same space. Each device in the set of selected devices may measure a partial area of the space, combine partial area measurements from other devices in the set of selected device into a collective area measurement of the space, combine the power consumption for each device into a total power consumption value for the space and computing the lighting power density of the space associated with the selected set of devices.

In some examples, each device used to calculate the lighting power density may be a light fixture with a mounted sensor. The light fixture may include a near Infrared emitter, a low-resolution two-dimensional image sensor capable of capturing images of near infrared signals, an image processor, a control module capable of coordinating tasks on a decentralized network, a hard-wired communication interface that connects to a light source controller, such as an LED driver that is co-located in the light fixture, and a communications interface, such as a radio frequency communication module. In the present example, the light source controller may be capable of reporting the power level of the light fixture to the device over an internal communication interface, such as the Digital Addressable Lighting Interface (DALI) to the device. In other examples, a device may be a separate standalone device capable of being installed and mounted into existing light fixtures to measure the physical arrangement of devices in the space.

In the present example, the near infrared emitter may be capable of projecting near infrared light at a commonly used wavelength, such as 850 nm or 940 nm. The near infrared emitter may be configured such that the emission angle is sufficiently wide to cover the field of view of low-resolution two-dimensional image sensor.

In some examples, devices may be in communication with each other via a wireless decentralized communication network. For example, the decentralized network may be a private network where only devices provisioned for the network may communicate with each other. Each device connected to the decentralized network may operate as an independent decision-making authority responsible for interacting directly with other devices. Accordingly, the decentralized network does not include a host controller, external software agent, mobile device or intermediary control hardware that may be used to aggregate data, monitor communication, dispatch messages or perform any type of supervisory logical function.

In some example, the lighting power density of a space may then be calculated by have each device in the decentralized network determine a subset of devices that are located in a space from the full set of devices connected to the decentralized network. Each device then performs measures a relative position between to a detectable room boundary, such as a wall or doorway, and between to other detectable devices in the same space. The measurements are then combined with measurements taken by other selected devices to calculate the area of the space in which the set of selected devices are located. Each device measure the power consumption of the light fixture associated with the device and communicates the power with other selected devices in the space. Accordingly, each device in the set of selected devices will have the area of the space and the power consumption of all the selected devices. Each device may then calculate the lighting power density of the space by dividing the total power by the area of the space.

By using direct measurements, it is to be appreciated by a person of skill with the benefit of this description that actual lighting power densities may be obtained instead of using simulations and modelling to design a light fixture layout for a space. Since the simulation and modeling environments may not be perfect representations of the physical space and lead to inaccuracies when measured in the actual physical space, a verification with actual measurements may be carried out. For example, inaccuracies may arise from the perceived lighting uniformity by a building occupant, the variation in surface reflectivity of the finished space, changes to the built environment that occurred during the construction phase, among other factors.

Therefore, to provide a targeted lighting power density while providing sufficient and uniform illumination throughout a space, a design and verification process involving the selection of light fixtures with known power input and light output ratings along with the physical arrangement of the light fixtures within the space is carried out. The design process may involve simulation and analysis of a lighting plan to confirm the design meets the target lighting power density and target illumination level.

Figure 1:
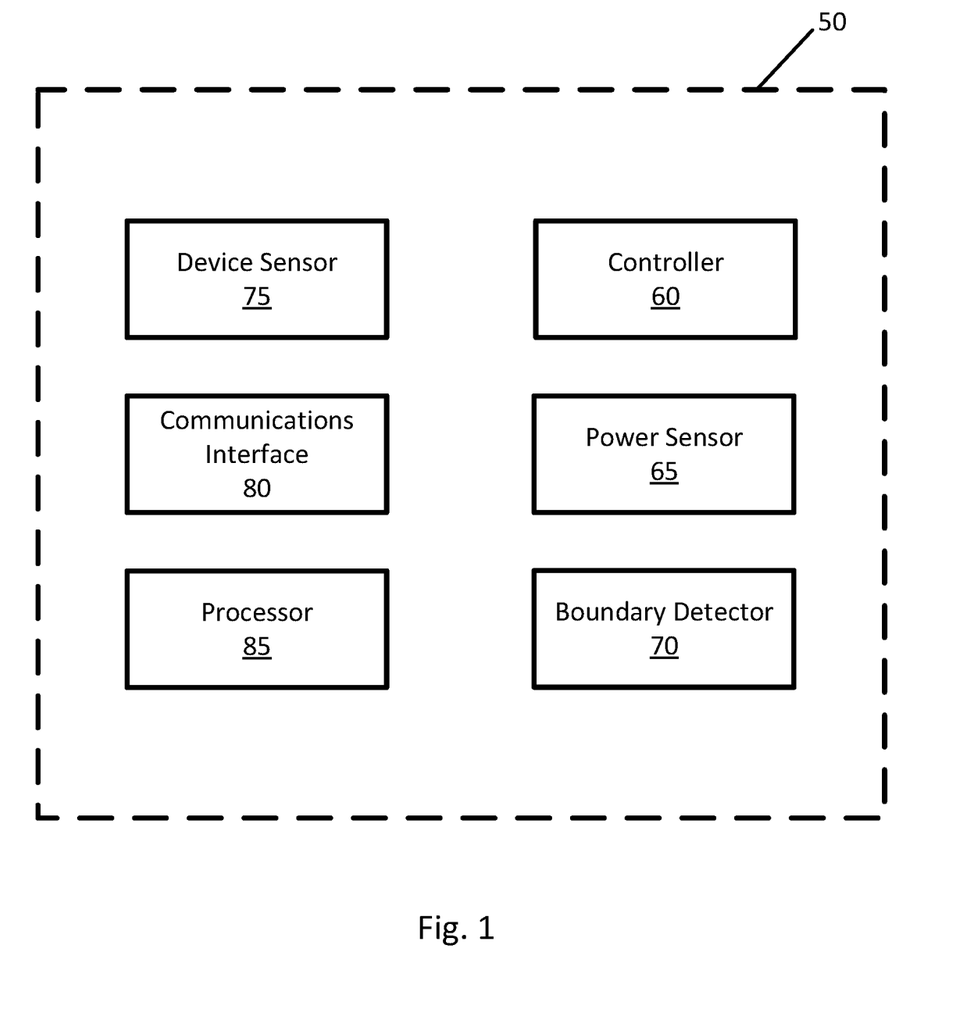
FIG. 1 is a schematic representation of the components of an apparatus to measure a lighting power density for a space as part of a decentralized network.

Referring to FIG. 1, a schematic representation of an apparatus to measure a lighting power density for a space as part of a decentralized network is generally shown at 50. In the present example, the apparatus 50 may be a device as described above. Furthermore, the apparatus 50 may include additional components, such as various additional interfaces and/or input/output devices such as indicators to interact with a user or installer of the apparatus 50. The interactions may include viewing the operational status, updating parameters, or resetting the apparatus 50. In the present example, the apparatus 50 includes a light source controller 60, a power sensor 65, a boundary detector 70, a device sensor 75, a communications interface 80, and a processor 85.

In the present example, the light source controller 60 is to control a light source (not shown). In particular, the light source controller 60 may provide power to the light source or turn off the light source by cutting off power. Furthermore, the light source controller 60 further controls the intensity of the light source. In the present example, the light source controller 60 varies the intensity of the light source by varying the amount of power supplied to the light source. Accordingly, the light source controller 60 may be used to adjust the illumination level of a space while managing the power consumption of the light fixture.

It is to be appreciated by a person of skill in the art with the benefit of this description that the light source controller 60 may be connected to a light source that is part of the apparatus 50. Accordingly, the lighting power density for an installation may be monitored and controlled. In other examples, the light source controller 60 may be connected to an external light source, such as an existing light fixture. Accordingly, the apparatus 50 may be used to measure the lighting power density of an existing installation and to control the power consumption of the installation.

The power sensor 65 is to measure the power used to emit light from the light source associated with the apparatus 50. The manner by which the power sensor 65 measures the power is not limited. For example, the power sensor 65 may measure a current across a light source and a voltage drop across the light source to determine the power consumed by the light source. In another example, the power sensor 65 may measure a drawn by the lighting fixture and a voltage drop across the light fixture to measure the total power drawn by the light fixture from an external source such as the building power supply. It is to be appreciated by a person of skill with the benefit of this description that in some examples, other components associated with the light source, such as the light source controller 60 may draw some power that is to be included in the calculation of the lighting power density. However, the amount of power drawn by such peripheral devices may be considered negligible in some examples. In other examples, the power sensor 65 may be part of the electronics of the light source, such as an LED driver.

In the present example, the boundary detector 70 is to detect a room boundary within range of the apparatus 50. The manner by which the boundary detector 70 detects a room boundary, such as a wall, a doorway, or other partition, is not particularly limited. For example, the boundary detector 70 may use various boundary detection techniques. such as emitting an electromagnetic signal or acoustic signal and measuring the return signal reflected off a boundary. In particular, the boundary detector 70 may include an infrared emitter and detector to determine the relative position between the apparatus and the room boundary or a portion of the room boundary within the detection range of the boundary sensor 70. In other examples, an image capture device may be used along with image processing to determine the range and directions of nearby room boundaries.

The device sensor 75 is to determine the position of a proximate device. In addition, the device sensor 75 may also determine whether the proximate device is within the space for which the lighting power density is to be calculated. The manner by which the relative position of the proximate device is determined is not particularly limited. For example, the proximate device may emit a light signal, such as near infrared light, for the device sensor 75 to detect. The measured light may then be analyzed using image processing techniques or machine learning techniques to estimate a range and direction.

The communications interface 80 is to communicate with another device in the decentralized network. In the present example, the communications interface 80 is capable of communication with all devices that are part of the decentralized network. The manner by which the communications interface 80 communicates with other devices is not limited and may include sending wireless signals to another device and receive signals from the device. In other examples, the communication signals may be relayed along several devices in the decentralized network for devices that are too far to communicated directly with each other.

In the present example, the communications interface 80 is to transmit measured data to a proximate device within the same space. The measured data is not particularly limited and may include data measured by the various components of the apparatus 50. For example, the measured data may include a power measurement obtained from the power sensor 65. The measured data may also include data collected by the boundary detector 70, such as the location of all or of portion of the room boundary in which the apparatus 50 is located. Furthermore, the measured data may include network collected by the device sensor 75 relating to the position and/or identification of other devices connected to the decentralized network. In further examples, the measured data may also include data collected from additional components such as an illumination sensor (not shown). Accordingly, the measured data may be any measured and generated at the apparatus 50.

In addition, the communications interface 80 may be used to receive device data from other devices on the decentralized network such as a proximate device within the same space. The device data may be similar data collected by another device as the measured data collected by the apparatus 50. Accordingly, by transmitting and receiving data with other devices on the decentralized network the apparatus 50 and other devices will obtain the measured data from other devices. Through this exchange of data, the apparatus will be able to obtain data about a space such as the power used by each device in the space, the number of devices in the space, as well as dimension of the space defined by a room boundary. The aggregated data may then be used by the processor 85 is described in greater detail below.

In the present example, the communications interface 80 may communicate with other devices over the decentralize network, which may be a secured network of provisioned devices using a protocol, such as a Bluetooth. However, in other examples, the communications interface 80 may use other communication signals, such as infrared signals or through a wired connection.

The processor 85 is to calculate the lighting power density of a space based on the aggregated data from one or more other devices as well as the data collected from the apparatus 50. The manner by which the processor 85 calculates the lighting power density is not particularly limited. For example, the aggregated data from the devices in the space may be used to calculate the area of the space bounded by the room boundary. In the present example, the aggregated data includes the portions of the room boundary detected by each of the devices within the space. The processor 85 may use this data to generate a map of the space bounded by the room boundaries for which the lighting power density is to be calculated. It is to be appreciated by a person of skill with the benefit of this description that generating the map of the room boundary may involve stitching various portions of a room boundary as measured by multiple devices. In the event there are discrepancies regarding the location of the room boundary between devices, an average position may be used or an outlier measurement may be disregarded. Furthermore, in the event that portions of the room boundary were not detected by any of the devices within the space, the processor 85 may extrapolate the boundaries to form a closed room boundary. The area bounded by the room boundary may then be calculated.

The aggregated data may also include the power consumption for each of the devices within the space bounded by the room boundary. With this information, the lighting power density may then be calculated by dividing the total power consumption in the area by the devices by the area of the space illuminated by the devices.

The lighting power density may then be used by processor 85 to send commands to the light source controller 60 to adjust the power used by the light source to emit light. The manner by which the light source controller 60 adjusts the power consumption of a light source is not particularly limited. For example, the light source controller may adjust the power consumed by the light source to limit the lighting power density to be below a predetermined threshold value. The predetermined threshold value is not particularly limited and may be varied. For example, the lighting system may be subject to a local regulation that limits the lighting power density to a certain value. In this example, the threshold value may be set to a value at or below the permitted value to avoid running afoul of the regulation. In other examples, building management may have target power goals for conservation purposes and impose limits to the lighting power density to achieve the goals.

In the present example, the processor 85 is not particularly limited and may include a central processing unit, a microcontroller, a microprocessor, a processing core, a field-programmable gate array, an application-specific integrated circuit, or similar. The processor 85 may cooperate with a memory storage unit (not shown) to execute various instructions stored thereon. For example, the memory storage unit may store an operating system that is executable by the processor 85 to provide general functionality to the apparatus 50, including functionality to measure a lighting power density for a space as part of a decentralized network with other devices. Examples of operating systems include Android Things™, Apache Mynewt™, Zephyr™, and Windows 10 IoT™. Further operating systems may also include Windows™, MaCOS™, iOS™, Android™, Linux™, and Unix™.

Figure 2:
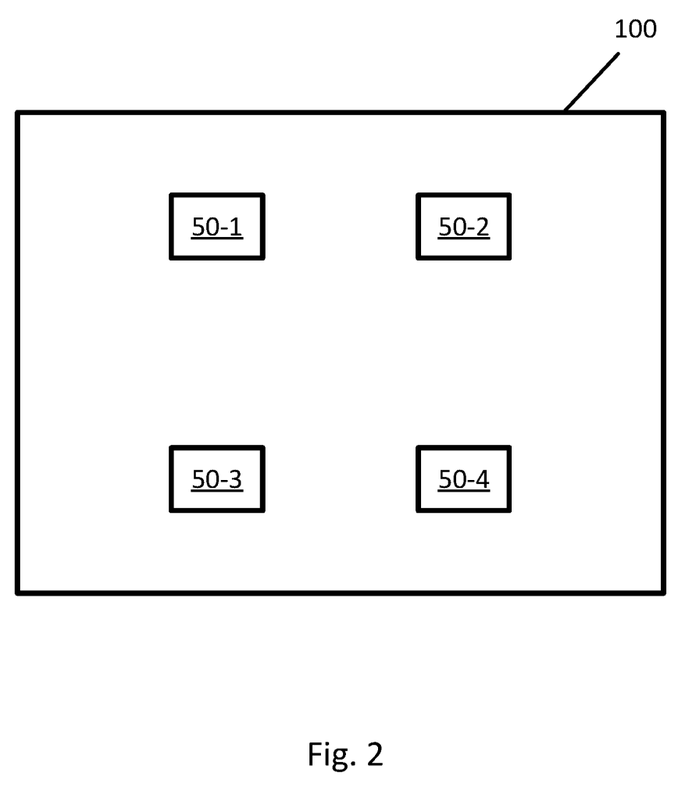
FIG. 2 is a schematic representation of a building space where a system of a plurality of apparatuses shown in FIG. 1 are deployed.

Referring to FIG. 2, a building space 100 with a plurality of apparatuses 50-1, 50-2, 50-3, and 50-4 (generically, these apparatuses are referred to herein as "apparatus 50" and collectively they are referred to as "apparatuses 50", this nomenclature is used elsewhere in this description) is shown. In the present example, each of the apparatus 50 is substantially identical and operate together to calculate the lighting power density for the building space 100. In the present example, the lighting power density is to be calculate by each apparatus 50 in an independent manner such that there is no reliance on a central controller. In this example, the apparatuses 50 may be installed in the building space 100 by simply mounting the apparatuses 50 to existing light fixtures in a support structure such as a ceiling grid.

It is to be appreciated by a person of skill with the benefit of this description that the total number of apparatuses 50 connected to the decentralized network may include more apparatuses 50 than illustrated in FIG. 2. For example, a decentralized network may span across many spaces or rooms within a building. Accordingly, the apparatuses 50-1, 50-2, 50-3, and 50-4 may be a subset of apparatuses 50 identified to be located in the space 100. In the present example, each apparatus 50 may belong to a unique subset as defined by the walls of the space 100 for which a lighting power density measurement is to be made. However, in other examples, the apparatus 50 device may belong to more than one subset, such as in a space with moveable walls to reconfigure rooms.

The manner by which the apparatuses 50 are grouped into the subset is not particularly limited and may be carried out autonomously using the boundary detectors 70 of each apparatus 50. For example, the apparatus 50-1 may establish inclusivity with each of the apparatus 50-2, 50-3, 50-4 to measure the area of the space 100 and the power used by the apparatuses 50 to illuminate the space. To determine whether an apparatus 50 is to be included in the subset, a determination may be made to establish if the apparatuses 50 are on the same side or opposite side of a wall. In the present example, the determination may be made without prior knowledge of the physical environment, such the building size or type, room size, room layout, room boundary materials, or the physical arrangement of the apparatuses within the building or any given room. Instead, each apparatus 50 may use various sensors and boundary detection techniques such as emitters and detectors of electromagnetic waves and patterns that may reflect differently based on the type of boundary. In addition, the determination of the subset of the apparatuses may be made without prior knowledge of the number of apparatuses 50 in the space 100 or in the building such that each apparatus 50 does not use memory or processing resources to maintain a database of apparatuses 50 connected to the decentralized network that are not in the established subset.

In some examples, each apparatus 50 may use a combination of radio frequency communication and near infrared transmission to identify another apparatus 50 that belongs to a subset. For example, radio frequency communication may be used by each apparatus 50 for an initial discovery of devices that are located within a prescribed number of message hops and to coordinate the near infrared signal by an apparatus 50 and the respective near infrared capture by another apparatus 50. In this example, since radio frequency communication may propagate through a wall, the set of apparatuses 50 identified in the initial discovery may not be complete or accurate representation of the subset in the space 100. The transmission of near infrared light does not propagate through opaque walls and provides a discernible reflection and refraction characteristic upon contact with a translucent/transparent wall. Accordingly, near infrared may be used to determining if two apparatuses 50 are on the same or opposite sides of a wall.

Once the apparatuses 50 establish the subset in the space 100, each apparatus 50 may receive data from the other apparatuses 50 in the space through the decentralized network via the communications interface 80 of each apparatus 50. The manner by which the communications interface 80 of each apparatus 50 communicates with another is not limited. The data collected be each apparatus 50 may then be used to calculate the total power consumption of all light sources within the space assuming that all light sources are connected with one of the apparatuses 50.

In the present example, each apparatus 50 may emit near infrared light and receive a radio frequency signal from a proximate apparatus 50 that is capable of receiving the near infrared signal. Each apparatus 50 maintains a list of each apparatus 50 from which a reciprocal near infrared light signal was detected. The list represents the apparatuses 50 with which near infrared signals may be directly detectable and may be referred to as a first-degree apparatus 50. Each apparatus 50 may then share its first-degree list with each apparatus 50 with which direct near infrared signals were detected. Upon the receipt of a first-degree list, each apparatus 50 may combine its first-degree list with the received first-degree list to form a graph that represents the relationship of proximate apparatuses 50 that may detect each other's near infrared signals. This process may be repeated by every apparatus 50 resulting in the cascading formation of a complete relationship graph that represents all of the apparatuses 50 in the subset.

To determine the boundary of the space 100, each apparatus 50 may use a near infrared emitter and receiver to determine the relative position to a boundary of the space 100 or to another apparatus 50 that is located in the space 100. For example, each apparatus 50 may emit near infrared light which to captured an image of the space 100 within the field of view of the near infrared sensor. The image may then be analyzed to determine the presence and distance to a room boundary or to another device. The method used to analyze the image of the near infrared light is not limited and may include classical image processing techniques used in combination with machine learning based object detection and classification methods.

In some examples, the apparatus 50 may illuminate its field of view using a near infrared emitter to project with a known pattern, such as a circle, or complex, such as a grid. The field of view may be designed to cover an area that is appropriately matched to or greater than the emission angle of the near infrared emitter. For example, the near infrared emitter may have an emission angle of 90° and the image sensor may have a field of view of 120°.

The result of the image analysis is a relative position dataset that may contain the coordinates of and/or the distance and angle between the apparatus 50 and one or more room boundaries or another apparatus 50 located in the space 100. The relative position data may be combined with the graph to form a labelled graph where objects and apparatus 50 are considered as graph vertices and the relative position between each apparatus 50 or between an apparatus and a room boundary is considered to be the value applied to the graph edges.

Given the labelled graph, each apparatus 50 will have sufficient information to calculate the area of the space 100. Each apparatus 50 may examine the graph to determine values that are used for the area calculation. These values may include the perimeter of the space, the aspect ratio of the space, the distance between key points, such as corners of the space among other metrics.

Each apparatus 50 may then obtain a power measurement from the power sensor 65 of each apparatus 50. The power measurement from each apparatus 50 in the space 100 may be shared with the other apparatuses 50 in the space 100. Accordingly, each apparatus 50 may add their local power consumption value with the power consumption value received from proximate apparatus 50 to obtain the total power consumed in the space 100.

Each apparatus 50 may then calculate the lighting power density by dividing the total power by the total area of the space 100. This information may then be made available to external devices. It is to be appreciated by a person of skill with the benefit of this description that since each apparatus calculates the lighting power density, discrepancies may arise.

Once a leading power density value is established for the space 100, the apparatuses 50 may adjust the illumination to achieve a target lighting power density value. In some examples, the illumination level may degrade over time as the light sources degrade. Accordingly, the illumination level may be increased by increasing the power and the plurality of apparatuses 50 may be used to confirm that the lighting power density does not exceed the target or threshold lighting power density. In this example, upon initial installation, the lighting power density value may be lowered below the threshold value to maintain that illumination levels. Over time, the lighting power density value may be gradually increased to compensate for degradation in light level output.

In some examples, the apparatuses 50 may also receive a new lighting power density threshold such as when building managers choose to adopt a higher efficiency. Given a starting lighting power density value, the apparatuses may lower their power consumption until the target lighting power density value is achieved. In some example, each apparatus 50 may include an illumination sensor to measure the light level in the space 100 periodically to adjust the power supplied to each light source. It is to be appreciated that the process described may be carried out on a continuous basis to allow the lighting power density value to be varied as a room configuration changes or as each apparatus 50 is relocated to a new position either within the space 100 or to another space in the building.

Figure 3:
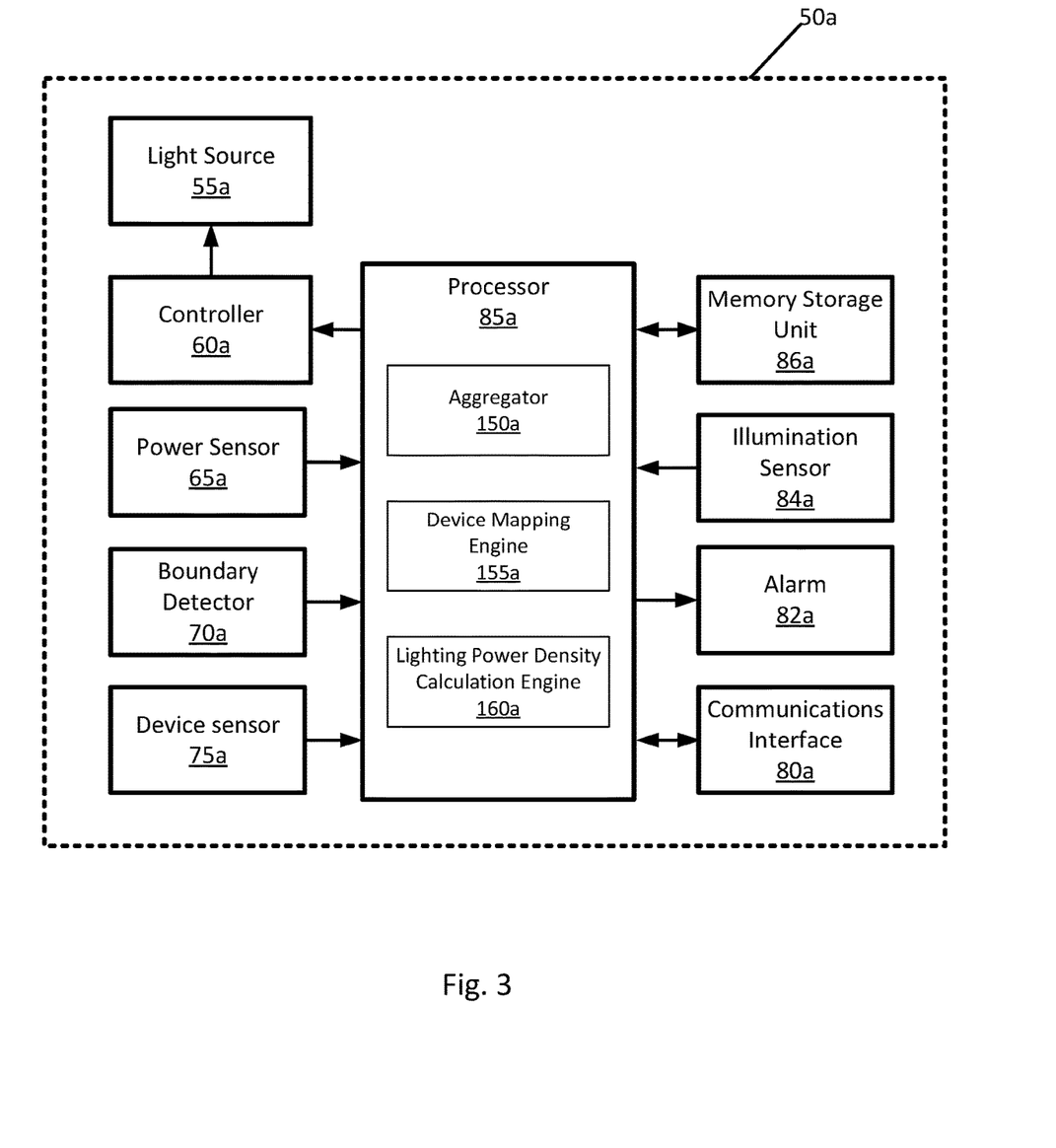
FIG. 3 is a schematic representation of the components of another apparatus to measure a lighting power density for a space as part of a decentralized network.

Referring to FIG. 3, another schematic representation of an apparatus to measure a lighting power density for a space as part of a decentralized network is generally shown at 50a. Like components of the apparatus 50a bear like reference to their counterparts in the apparatus 50, except followed by the suffix "a". In the present example, the apparatus 50a includes a light source 55a, a light source controller 60a, a power sensor 65a, a boundary detector 70a, device sensor 75a, a communications interface 80a, a processor 85a, an alarm 82a, an illumination sensor 84a, and a memory storage unit 86a. In the present example, the processor 90a includes components to operate an aggregator 150a, a device mapping engine 155a, and a lighting power density calculation engine 160a.

The light source 55a is to illuminate a space, such as a room or a portion of a room. In the present example, the light source 55a is mounted within a housing to direct toward the space to be illuminated. The light source 55a is not particularly limited and may be any device capable of generating light for the purposes of space lighting. For example, the light source 55a may include an incandescent light bulb, a fluorescent light bulb, a light emitting diode, or an array of any of these types of light emitters.

In the present example, the processor 85a may operate an aggregator 150a to aggregate data received via the communications interface 80a from other proximate devices. For example, the aggregator 150a may index and store the data from each device in a database maintained on the memory storage unit 86a. Furthermore, the processor 85a may operate a device mapping engine 155a to map the space for which the lighting power density is to be calculated based on the aggregated data. The device mapping engine 155a uses data collected by the device sensor 75a, such as range and direction of other devices within the space, to map the devices in a space. This positional data for the devices may be collected by the device sensor 75a each other device in the space and may be shared via the communications interface 80a and aggregated by the aggregator 150a. The positional data for each device relative to the apparatus 50a may then be used by the device mapping engine 155a to generate a map of the devices in the space.

In addition to positional data for each device, the data received may include a portion of a room boundary within the detection range of the device. In particular, a device may provide the relative position of a boundary detected by the boundary detector 70a. In some examples, there is no single device that may identify the entire room boundary. Accordingly, the device mapping engine 155a may merge the portions of the room boundary received from multiple devices within the space for which the lighting power density is to be calculated. A room boundary may then be generated around the space for which the lighting power density is to be calculated based on the relative position of the room boundary from the multiple devices. If there are holes in the room boundary, such as if a portion of the boundary is not within the range of the boundary detector 70a of any device, the device mapping engine 155a may extrapolate portions of the room boundary to form a closed boundary around the space for which the lighting power density is to be calculated.

It is to be appreciated by a person of skill with the benefit of this description that although the boundary detector 70a and the device sensor 75a are shown as different components of the apparatus 50a, the boundary detector 70a and the device sensor 75a may use the same hardware to collect data. For example, both of the boundary detector 70a and the device sensor 75a may use a near infrared emitter and sensor. In the case of the boundary detector 70a, the near infrared emitter may emit light and the sensor may detect changes in a reflected pattern to detect a room boundary. In the case of the device sensor 75a, the near infrared emitter may transmit light to be detected by another device and vice versa.

The processor 85a may further operate a lighting power density determination engine 160a to calculate the lighting power density based on the power consumed by the devices in a space and the area of the space. The area of the space may be calculated based on the room boundary determined by the device mapping engine 155a. The total power of the devices may be obtained in the data received from each device. The lighting power density is then calculated by dividing the power by the area.

The alarm 82a is to generate an alert to provide notification to a triggering event. In the present example, the alarm 82a is to be triggered when the lighting power density exceeds a predetermined threshold value. The manner by which the alarm provides the notification is not particularly limited. In the present example, the alarm 82a may generate a message to be transmitted to an administrator or building manager. In other examples, the alarm 82a may activate a notification light or generate an audible notification.

Furthermore, the apparatus 50a may include an illumination sensor 84a to measure a brightness level in a space. The brightness may be detected using a photosensor such as a photodiode. The measurements may be included in the data transmitted from the apparatus 50a to other devices in the space as well as received from the other devices. The brightness level may be used as an input by the light source controller 60a to maintain the brightness level. As a specific example, the brightness of the light source 55a may degrade throughout it service life. If the brightness measured by the illumination sensor 84a at a location within the space, the power may be increased to maintain the brightness level as long as the lighting power density does not exceed a predetermined threshold. If the brightness level cannot be maintained while staying below the lighting power density threshold, the alarm 82a may generate a notification to advise that that the light source 55a is to be replaces.

The memory storage unit 86a is to store data to be used by the processor 85a. For example, the memory storage unit 86a may store measured data from the power sensor 65a, the boundary detector 70a, the device sensor 75a, the illumination sensor 84a, as well as data generated by the processor 85a, such as the area of the space and the lighting power density. In addition, the memory storage unit 86a may also be used to store data received from other devices within the space or connected to the decentralized network in a database.

In the present example, the memory storage unit 86a may include a non-transitory machine-readable storage medium that may be any electronic, magnetic, optical, or other physical storage device. In other examples, the memory storage unit 86a may be an external unit such as an external hard drive, or a cloud service providing content. The memory storage unit 86*a* may also be used to store instructions for general operation of the apparatus 50*a*. In particular, the memory storage unit 86*a* may store an operating system that is executable by a processor to provide general functionality to the apparatus 50*a*, for example, functionality to support various applications to control the light source 55*a*. Furthermore, the memory storage unit 86*a* may also store control instructions to operate other components and peripheral devices of the apparatus 50*a*, such additional sensors, cameras, user interfaces, and light sources.

Figure 4:
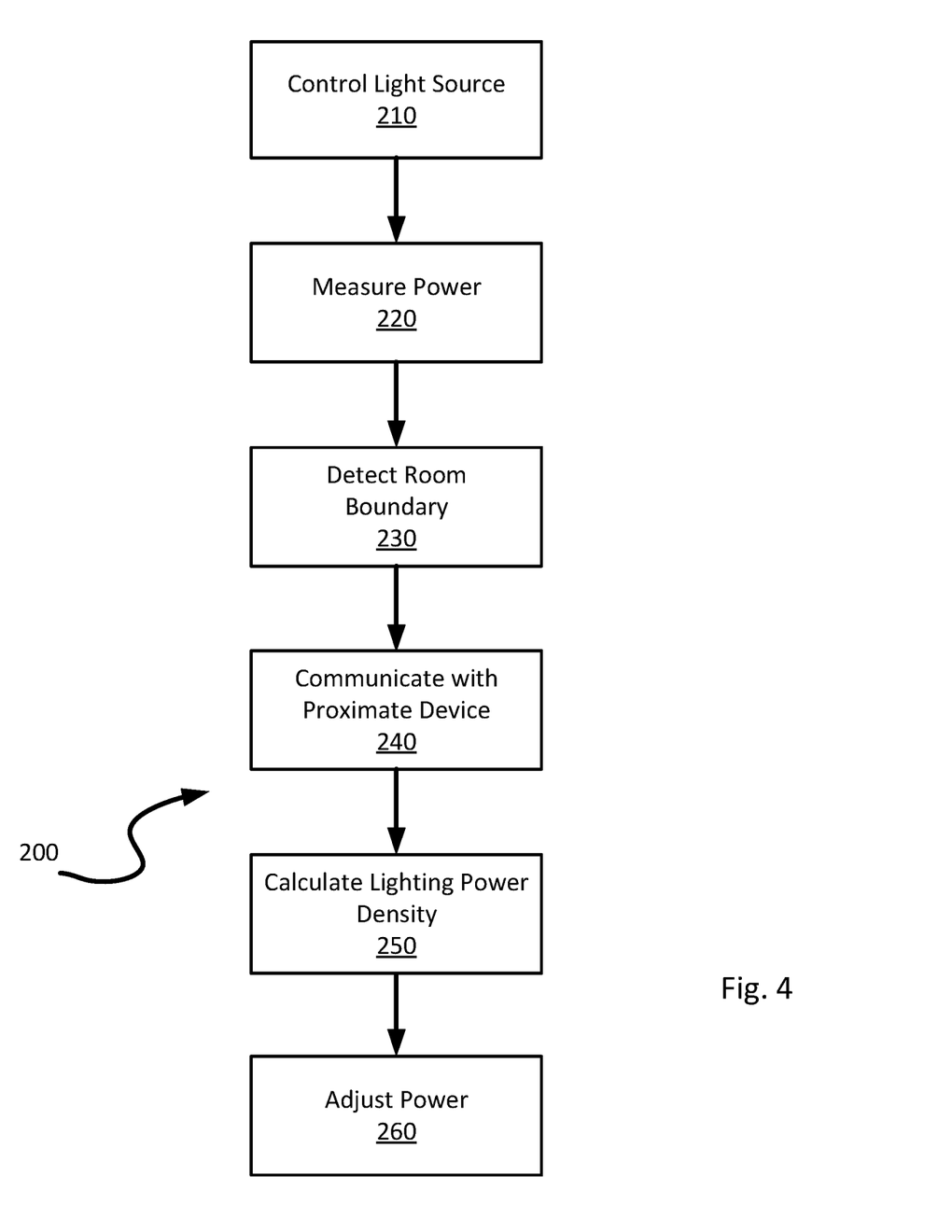
FIG. 4 is a flowchart of an example of a method of measuring a lighting power density for a space as part of a decentralized network.

Referring to FIG. 4, a flowchart of an example method of measuring a lighting power density in a space is generally shown at 200. In order to assist in the explanation of method 200, it will be assumed that method 200 may be performed with a plurality of the apparatus 50. Indeed, the method 200 may be one way in which the apparatus 50 and other devices may be configured. Furthermore, the following discussion of method 200 may lead to a further understanding of the apparatus 50 and its components. In addition, it is to be emphasized, that method 200 may not be performed in the exact sequence as shown, and various blocks may be performed in parallel rather than in sequence, or in a different sequence altogether.

Beginning at block 210, a light source is to be controlled by such that the intensity of the light emitted by the light source may be changed or varied. In the present example, the apparatus 50 may be installed with a light source included or the apparatus 50 may be installed into an existing light installation to monitor a lighting power density.

Block 220 involves measuring the power used to emit the light. The manner by which the power is measured is not limited. For example, the power may be measured using an ammeter to measure the current across the light source and the voltage drop across the light source to determine the power consumed by the light source. In another example, the power may be measured across the entire apparatus to include the power used by various peripheral components.

Block 230 involves detecting a room boundary within range of the boundary detector 70 of the apparatus as well as the positions of a proximate device within the same space. Block 240 communicates with other devices in the same space to transmit measured data from the apparatus 50 as well as to receive device data from external devices. The aggregated data may then be used to calculate a lighting power density at block 250. The lighting power density calculated at block 250 may then be used by the light source controller 60 to adjust the power used to emit light to meet regulations on energy usage or to manage the power consumption of a building lighting system.

Variations to the methods and apparatus describe above are contemplated. For example, it is to be appreciated that the devices in the space for which the lighting power density is to be calculate may be different. For example, a space may include some apparatus 50 and some apparatus 50*a* as the devices. Furthermore, since each apparatus 50 or apparatus 50*a* calculates the lighting power density separately and individually, it is to be appreciated that the values calculated by each device may vary. The variation may be caused by data being measured at different times, such as the power consumption variation or due to an error with the devices. Accordingly, the lighting power density value may be verified among the devices to remove large deviations or to implement an averaging or voting system.

Various advantages will now become apparent to a person of skill with the benefit of this description. For example, the process is autonomous upon power up without human involvement to start, monitor, and make adjustments to control power consumption. In addition, the predetermined threshold for the lighting power density may account for the degradation of the light source over time. Therefore, a spaces may initially be over-lit upon installation so that a brightness level may be maintained as the light source degrades. Accordingly, the threshold lighting power density greater that the amount of power used to illuminate a space to a target brightness level for a significant portion of the service life of the light source.

It should be recognized that features and aspects of the various examples provided above may be combined into further examples that also fall within the scope of the present disclosure.

What is claimed is:

1. An apparatus comprising:
a power sensor to measure a power used to emit light;
a light source controller to control a light source, wherein the light source controller is to change an intensity of the light emitted by the light source;
a boundary detector to detect a room boundary;
a device sensor to determine a position of a proximate device;
a communications interface to communicate with the proximate device, wherein the communications interface is to transmit measured data to the proximate device, and wherein the communications interface is to receive device data from the proximate device; and
a processor to calculate a lighting power density based on the proximate device data and the measured data, wherein the lighting power density is to be used by the light source controller to adjust the power used to emit the light.

2. The apparatus of claim 1, wherein the power sensor measures the power from an external source.

3. The apparatus of claim 1, wherein the light source controller is to adjust the power to maintain the lighting power density below a threshold value.

4. The apparatus of claim 3, wherein the threshold value is variable.

5. The apparatus of claim 3, further comprising an alarm to be triggered when the lighting power density exceeds the threshold value.

6. The apparatus of claim 1, further comprising an illumination sensor to determine a brightness level of a space, and wherein the light source controller is to maintain the brightness level.

7. A method comprising:
controlling a light source to change an intensity of the light emitted by the light source;
measuring a power used to emit the light;
detecting a room boundary and a position of a proximate device;
communicating with the proximate device to transmit measured data to the proximate device, and to receive proximate device data from the proximate device;
calculating a lighting power density based on the proximate device data and the measured data; and
adjusting the power used to emit the light based on the lighting power density.

8. The method of claim 7, wherein measuring the power comprises measuring the power from an external source.

9. The method of claim 7, wherein adjusting the power comprises adjusting the power to maintain the lighting power density below a threshold value.

10. The method of claim 9, wherein the threshold value is variable.

11. The method of claim 9, further comprising triggering an alarm when the lighting power density exceeds the threshold value.

12. The method of claim 11, further comprising transmitting a message generated by the alarm.

13. The method of claim 7, further comprising determining a brightness level of a space and adjusting the intensity of the light emitted by the light source to maintain the brightness level.

14. A non-transitory machine-readable storage medium encoded with instructions executable by a processor, the non-transitory machine-readable storage medium comprising:
- instructions to control a light source to change an intensity of the light emitted by the light source;
- instructions to measure a power used to emit the light;
- instructions to detect a room boundary and a position of a proximate device;
- instructions to communicate with the proximate device to transmit measured data to the proximate device, and to receive proximate device data from the proximate device;
- instructions to calculate a lighting power density based on the proximate device data and the measured data; and
- instructions to adjust the power used to emit the light based on the lighting power density.

15. The non-transitory machine-readable storage medium of claim 14, wherein the instructions to measure the power includes instructions to measure the power from an external source.

16. The non-transitory machine-readable storage medium of claim 14, wherein the instructions to adjust the power include instructions to adjust the power to maintain the lighting power density below a threshold value.

17. The non-transitory machine-readable storage medium of claim 16, wherein the threshold value is variable.

18. The non-transitory machine-readable storage medium of claim 16, further comprising instructions to trigger an alarm when the lighting power density exceeds the threshold value.

19. The non-transitory machine-readable storage medium of claim 18, further comprising instructions to transmit a message generated by the alarm.

20. The non-transitory machine-readable storage medium of claim 14, further comprising instructions to determine a brightness level of a space and to adjust the intensity of the light emitted by the light source to maintain the brightness level.

* * * * *